US009739310B2

(12) United States Patent
Dourlens et al.

(10) Patent No.: US 9,739,310 B2
(45) Date of Patent: Aug. 22, 2017

(54) TILT PAD BEARING WITH THROUGH-PIVOT LUBRICATION

(75) Inventors: Herve Dourlens, Goderville (FR); Claude Lemetteil, Manneville la Goupil (FR)

(73) Assignee: Dresser-Rand Company, Olean, NY (US)

( * ) Notice: Subject to any disclaimer, the term of this patent is extended or adjusted under 35 U.S.C. 154(b) by 305 days.

(21) Appl. No.: 14/344,932

(22) PCT Filed: Sep. 14, 2012

(86) PCT No.: PCT/US2012/055459
§ 371 (c)(1),
(2), (4) Date: Jan. 5, 2015

(87) PCT Pub. No.: WO2013/043495
PCT Pub. Date: Mar. 28, 2013

(65) Prior Publication Data
US 2015/0159692 A1 Jun. 11, 2015

Related U.S. Application Data

(60) Provisional application No. 61/537,339, filed on Sep. 21, 2011.

(51) Int. Cl.
*F16C 33/02* (2006.01)
*F16C 23/04* (2006.01)
(Continued)

(52) U.S. Cl.
CPC .............. *F16C 33/02* (2013.01); *F16C 17/03* (2013.01); *F16C 17/06* (2013.01); *F16C 33/10* (2013.01); *F16C 33/1085* (2013.01)

(58) Field of Classification Search
CPC .......... F16C 17/03; F16C 17/06; F16C 33/02; F16C 33/10; F16C 33/1085; F16C 33/106;
(Continued)

(56) References Cited

U.S. PATENT DOCUMENTS 3,687,510 A * 8/1972 Cooper ................... F16C 17/03
384/311
3,982,796 A * 9/1976 Hill .......................... F16C 17/06
384/307
(Continued)

FOREIGN PATENT DOCUMENTS

FR 2507265 A1 10/1982
JP S5837312 A 3/1983
(Continued)

OTHER PUBLICATIONS

PCT International Search Report for International Application No. PCT/US2012/055459 dated Feb. 28, 2013.
(Continued)

*Primary Examiner* — Marcus Charles

(57) ABSTRACT

A tilt pad bearing may include a support structure having first and second support structure surfaces. A pivot may have first and second pivot surfaces, and the first pivot surface may be coupled to the second support structure surface. A pad may have first and second pad surfaces, and the first pad surface may be coupled to the second pivot surface. A path of fluid communication may extend from the first support structure surface, through the pivot, and to an opening in the second pad surface.

13 Claims, 5 Drawing Sheets

(51) Int. Cl.
*F16C 33/10* (2006.01)
*F16C 17/03* (2006.01)
*F16C 17/06* (2006.01)

(58) Field of Classification Search
CPC .. F16C 33/1045; Y10S 384/90; F01D 25/162; F01D 25/166; F01D 25/18
USPC ........ 384/192, 306–309, 313, 317, 321–322, 384/368, 420, 900, 316, 397
See application file for complete search history.

(56) References Cited

U.S. PATENT DOCUMENTS

| | | | | |
|---|---|---|---|---|
| 4,247,157 A | * | 1/1981 | Sigg | F01D 25/166 384/307 |
| 4,335,925 A | * | 6/1982 | Stopp | F16C 17/06 384/125 |
| 4,456,391 A | * | 6/1984 | New | F16C 17/06 384/307 |
| 4,597,676 A | * | 7/1986 | Vohr | F16C 17/02 384/114 |
| 4,699,524 A | * | 10/1987 | Bath | F16C 37/002 384/122 |
| 5,288,153 A | * | 2/1994 | Gardner | F16C 17/03 384/117 |
| 5,482,380 A | * | 1/1996 | Corratti | F16C 17/03 384/309 |
| 5,720,558 A | * | 2/1998 | Edney | F16C 33/108 384/117 |
| 5,738,447 A | * | 4/1998 | Nicholas | F16C 32/0622 384/117 |
| 5,743,657 A | * | 4/1998 | O'Reilly | F16C 43/02 384/312 |
| 6,000,851 A | * | 12/1999 | Cohen | F16C 17/03 384/114 |
| 6,485,182 B2 | * | 11/2002 | Nicholas | F16C 17/03 384/117 |
| 6,623,164 B1 | * | 9/2003 | Gozdawa | F16C 17/03 384/117 |
| 6,739,756 B2 | | 5/2004 | Miller | |
| 6,746,152 B2 | * | 6/2004 | Branagan | F16C 17/06 384/122 |
| 7,237,957 B2 | * | 7/2007 | Geiger | F16C 17/03 384/309 |
| 8,366,323 B2 | * | 2/2013 | Waki | F16C 17/03 384/117 |
| 9,022,658 B2 | * | 5/2015 | Buguin | F01D 25/166 384/117 |
| 2002/0141670 A1 | * | 10/2002 | Nicholas | F16C 17/03 384/317 |
| 2010/0215299 A1 | | 8/2010 | Waki et al. | |
| 2010/0220944 A1 | | 9/2010 | Waki et al. | |
| 2014/0270607 A1 | * | 9/2014 | Livermore-Hardy | F16C 37/002 384/117 |

FOREIGN PATENT DOCUMENTS

| | | | | |
|---|---|---|---|---|
| JP | 2001124062 A | * | 5/2001 | |
| KR | 1020070098126 A | | 10/2007 | |
| KR | 20090128849 A | * | 12/2009 | F16C 17/035 |
| WO | 9845608 | | 10/1998 | |
| WO | 0011360 | | 2/2000 | |
| WO | 02079657 A2 | | 10/2002 | |

OTHER PUBLICATIONS

PCT International Preliminary Report on Patentability for International Application No. PCT/US2012/055459 dated Oct. 22, 2013.

* cited by examiner

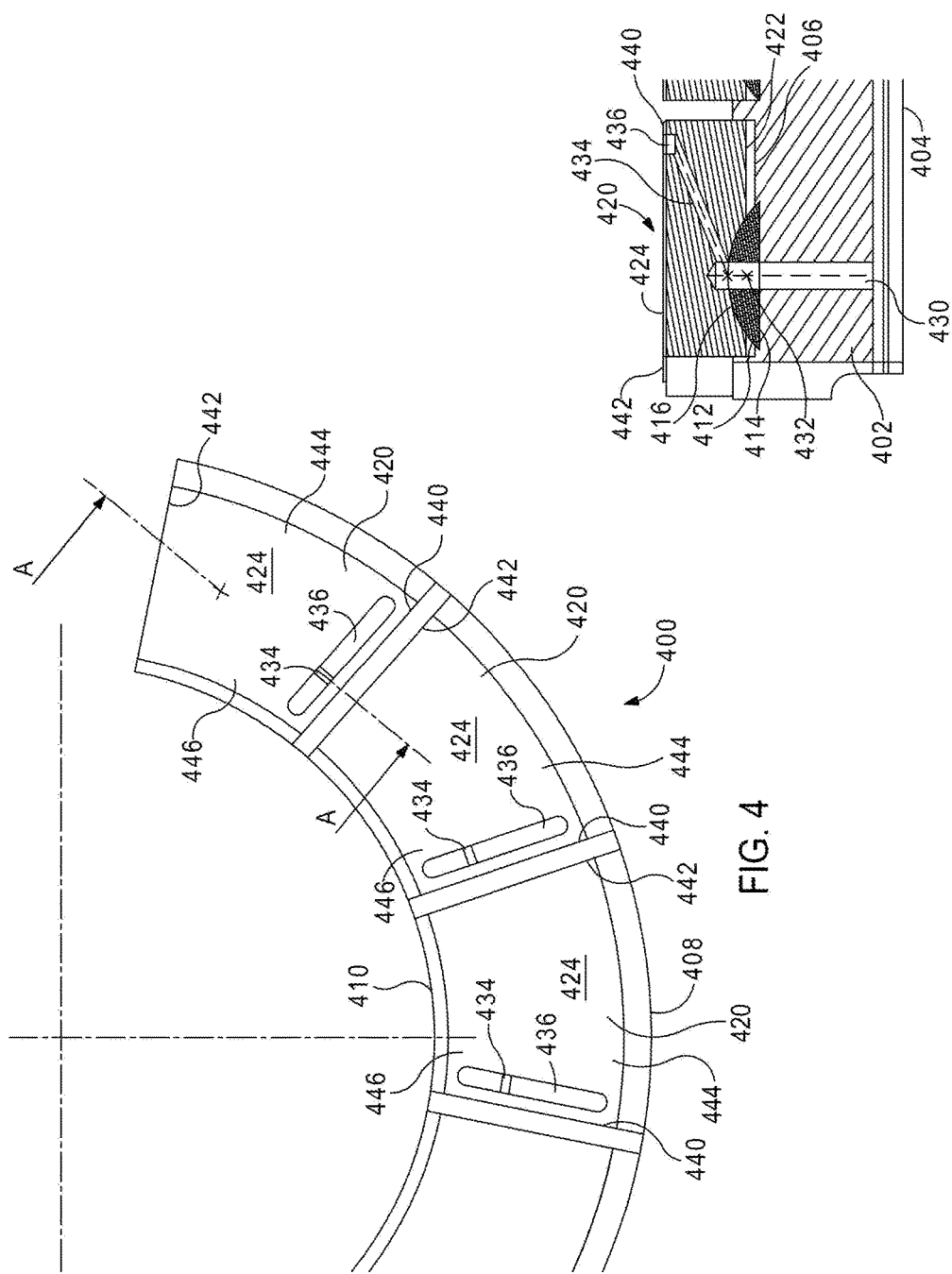

TILT PAD BEARING WITH THROUGH-PIVOT LUBRICATION

The present application is a national stage application of PCT Pat. App. No. PCT/US2012/055459, filed Sep. 14, 2012, which claims priority to U.S. Provisional Patent Application Ser. No. 61/537,339, which was filed Sep. 21, 2011. These priority applications are hereby incorporated by reference in their entirety into the present application, to the extent that these priority applications are not inconsistent with the present application.

BACKGROUND

Tilt pad bearings are used to support a rotating shaft within a turbomachine, such as a turbine or a compressor. Tilt pad bearings include a bearing cage and one or more pads that are coupled to the bearing cage through a pivot. The pads are adapted to contact and support the shaft, and the pivot enables the pads to move or "tilt" when supporting the shaft to prevent pad edge loading. When the rotating shaft contacts the pads, heat is rapidly generated due to the friction between the shaft and the pads. Lubricating fluid, such as oil, is often injected between the shaft and the pads to reduce the friction, and the associated heat, between the two components.

Oil injectors are oftentimes positioned between adjacent pads. When positioned in this manner, however, the oil injectors restrain the circulation of lubricant behind the pads, thus limiting the desired cooling effect to this region of the pads. To counteract this, other bearing designs include a small pipe that extends from the bearing cage through an edge of the pad and provides lubricant to the inner surface of the pad. The pipe, however, tends to reduce the ability of the pads to move freely on their pivots.

What is needed, therefore, is a practical approach for providing lubricant to the tilt pads of a bearing without restricting the range of motion of the pads.

SUMMARY

Embodiments of the disclosure may provide a tilt pad bearing including a support structure having first and second support structure surfaces. A pivot may have first and second pivot surfaces, and the first pivot surface may be coupled to the second support structure surface. A pad may have first and second pad surfaces, and the first pad surface may be coupled to the second pivot surface. A path of fluid communication may extend from the first support structure surface, through the pivot, and to an opening in the second pad surface.

Embodiments of the disclosure may also provide a tilt pad bearing including a support structure having first and second support structure surfaces and a support structure channel extending between the first and second support structure surfaces. A pivot may have first and second pivot surfaces, and the first pivot surface may be coupled to the second support structure surface. The pivot may define a pivot channel that extends between the first and second pivot surfaces and is in fluid communication with the support structure channel. A pad may have first and second pad surfaces, and the first pad surface may be coupled to the second pivot surface. The pad may define a pad channel that extends between the first and second pad surfaces and is in fluid communication with the pivot channel.

Embodiments of the disclosure may further provide a method of lubricating a tilt pad bearing. The method may include introducing a lubricant to a support structure channel defined by a support structure. The method may also include flowing the lubricant from the support structure channel into a pivot channel defined by a pivot and fluidly coupled to the support structure channel, and the pivot may be coupled to the support structure. The method may further include flowing the lubricant from the pivot channel into a pad channel defined by a pad and fluidly coupled to the pivot channel. The pad may be coupled to the pivot such that the pad is adapted to tilt with respect to the support structure.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 4 illustrates a top view of a portion of the tilt pad thrust bearing of FIG. 3, according to one or more embodiments disclosed.

FIG. 5 illustrates a cross-sectional view of the tilt pad thrust bearing depicted in FIG. 4 taken along line V-V, according to one or more embodiments disclosed.

DETAILED DESCRIPTION

Figure 1:
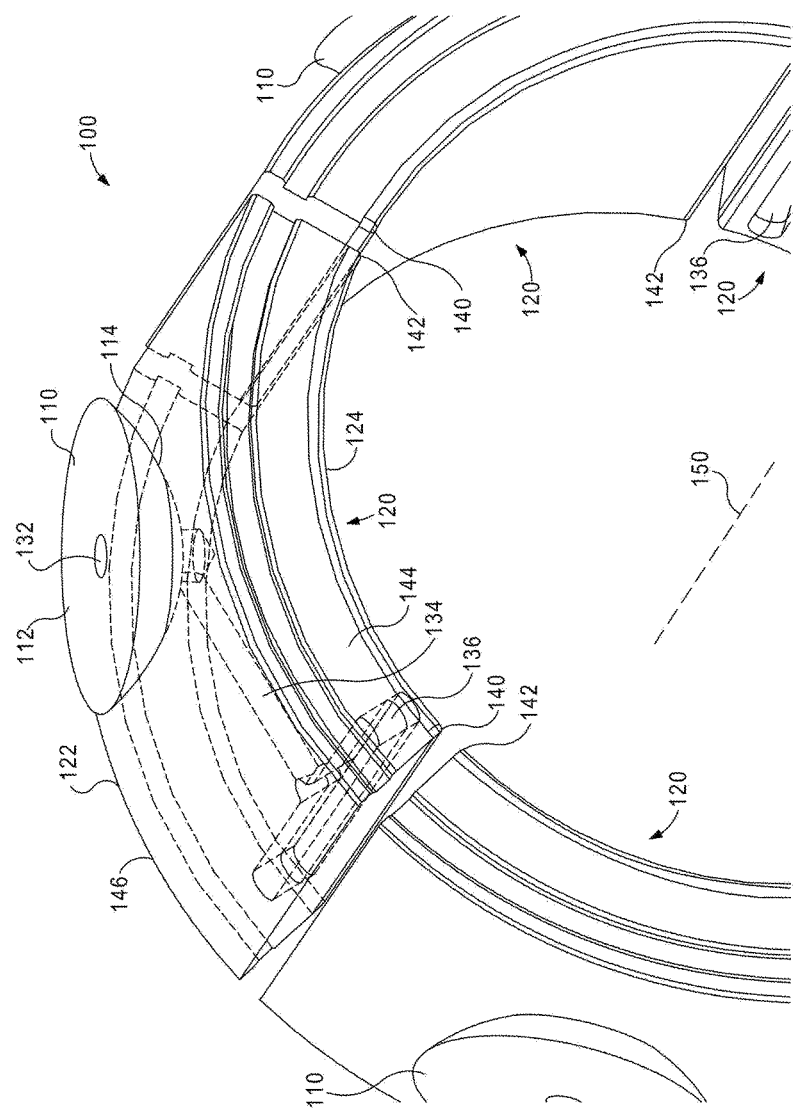
FIG. 1 illustrates a perspective view of a portion of a tilt pad journal bearing, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
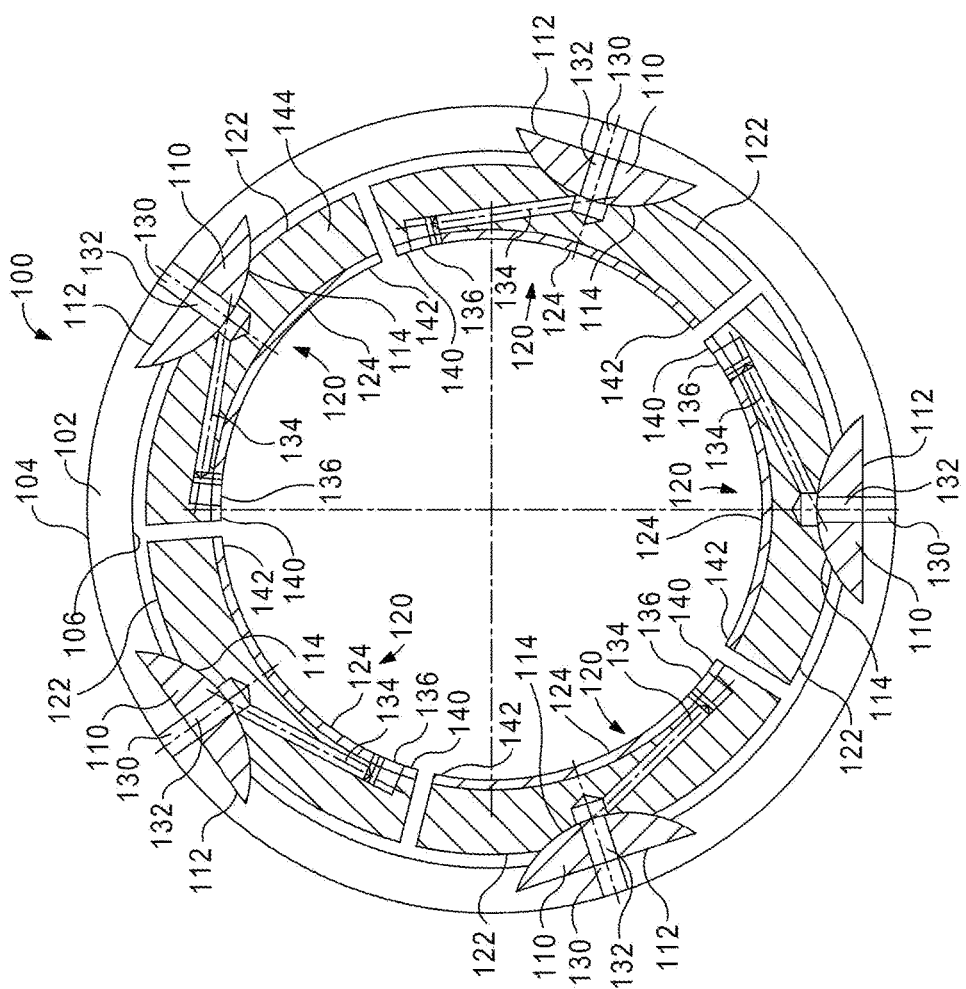
FIG. 2 illustrates a cross-sectional view of the tilt pad journal bearing of FIG. 1 having a bearing cage disposed circumferentially thereabout, according to one or more embodiments disclosed.

FIG. 1 illustrates a perspective view of a portion of a tilt pad journal bearing 100, and FIG. 2 illustrates a cross-sectional view of the tilt pad journal bearing 100 having a bearing cage 102 disposed circumferentially thereabout, according to one or more embodiments described. Referring to FIGS. 1 and 2, the journal bearing 100 may be adapted to engage and support a rotatable shaft (not shown) in a turbomachine. At least one journal bearing 100 may be disposed proximate each axial end of the shaft and adapted to support a radial load thereof. As will be appreciated by those of skill in the art, the bearing 100 may be used in a variety of turbomachine applications, such as turbines, compressors, pumps, etc.

The journal bearing 100 may include a support structure 102 (FIG. 2), or annular bearing cage, having a first, radially-outer surface 104 and a second, radially-inner surface 106. A bearing housing (not shown) may be disposed radially-outward from the outer surface 104 of the bearing cage 102, thereby maintaining the support structure aligned. One or more pivots 110 (five are shown) may be disposed radially-inward from the bearing cage 102. Each pivot 110 may have a first, outer surface 112 and a second, inner surface 114. The outer surface 112 of each pivot 110 may be coupled to and/or engaged with the inner surface 106 of the bearing cage 102. In at least one embodiment, the outer surface 112 may be generally flat, and the inner surface 114 may be arcuate, as illustrated.

One or more pads 120 (five are shown) may be disposed radially-inward from the respective pivots 110. Each pad 120 may have a first, outer surface 122 and a second, inner surface 124. The outer surface 122 of the pad 120 may be coupled to the inner surface 114 of the corresponding pivot 110. In operation, the arcuate inner surface 114 enables the pad 120 to move freely or "tilt" when supporting the shaft to accommodate shaft misalignment and reduce edge loading of the pads 120. Moreover, the pivots 110 enable the pads 120 to tilt from side-to-side in a radial plane with respect to a longitudinal axis 150 through the journal bearing 100. In other embodiments, the pivots 110 may enable the pads 120 to tilt from side-to-side in the radial plane with respect to the longitudinal axis 150 through the journal bearing 100, from side-to side in an axial plane with respect to the longitudinal axis 150, and all angles therebetween, i.e., move/rotate as a ball and socket joint. Although five circumferentially-offset pads 120 are shown, it is contemplated that the number of pads 120, and the circumferential spacing of the pads 120, may vary.

The bearing cage 102 may define one or more support structure channels or cage channels 130 extending from the outer surface 104 of the bearing cage 102 to the inner surface 106 of the bearing cage 102. Each pivot 110 may define one or more pivot channels 132 that extend from the outer surface 112 of the pivot 110 to the inner surface 114 of the pivot 110. Each pivot channel 132 may be in fluid communication with and contiguous with a corresponding cage channel 130. Each pad 120 may define one or more pad channels 134 that extend from the outer surface 122 of the pad 120 to one or more openings 136 (one is shown) in the inner surface 124 of the pad 120. Each pad channel 134 may be in fluid communication with and contiguous with a corresponding pivot channel 132. Thus, a path of fluid communication may extend from the outer surface 104 of the bearing cage 102, through the pivot 110 (via the pivot channel 132), and to the opening 136 in the inner surface 124 of the pad 120.

The opening 136 may be disposed proximate the leading edge 140 of the inner surface 124, the trailing edge 142 of the inner surface 124, or anywhere therebetween. As shown, the opening 136 is an axially-extending slot disposed proximate the leading edge 140 of the pad 120. In other embodiments, the opening 136 may include a plurality of openings 136 (not shown). For example, the openings 136 may be axially-spaced apart along the inner surface 124 of the pad 120, i.e., between first and second axial ends 144, 146 (see FIG. 1) of the pad 120. The opening(s) 136 may have any cross-sectional shape including, but not limited to, a circle, an oval, a square, a rectangle, combinations thereof, or the like. The cross-sectional area of the opening(s) 136 may be varied depending on typical operating conditions of the turbomachine, such as rotational speed, potential friction, temperature constraints, and frequency of use.

In operation, a lubricant, e.g., oil, may be introduced and/or injected to the inner surface 124 of the pads 120 to reduce the friction, and associated heat, between the pads 120 and the rotating shaft. The lubricant may be introduced to the cage channel 130 proximate the outer surface 104 of the bearing cage 102 and flow therethrough toward the inner surface 106 of the bearing cage 102 proximate the pivot 110. The lubricant may then flow from the cage channel 130 into and through the pivot channel 132. The lubricant may then flow from the pivot channel 132 into and through the pad channel 134 to the opening 136 in the inner surface 124 of the pad 120. One or more flow control devices (not shown) may be disposed in the cage channel 130, the pivot channel 132, and/or the pad channel 134 to adjust the rate at which the lubricant flows therethrough.

The axially-extending opening 136 may enable the lubricant to be distributed across the axial width of the pads 120. Further, the opening 136 may be disposed proximate the leading edge 140 of the pads 120 such that a shaft rotating in the clockwise direction, as viewed in FIGS. 1 and 2, may distribute the lubricant along the at least partially circumferential length of the pad 120 to the trailing edge 142. If it is desired to rotate the shaft in the opposite direction, the pads 120 may be rotated 180°. In another embodiment, the pads 120 may be removed from the bearing cage 102 and replaced with pads 120 having openings 136 in what is now the new leading edge 140. In this way, the bearing cage 102 is independent from the direction that the shaft rotates.

In at least one embodiment, the journal bearing 100 may be a primary bearing adapted to contact and support the shaft during normal operation of the turbomachine. In another embodiment, the journal bearing 100 may be an auxiliary bearing adapted to contact and support the shaft when the primary bearings are inactive or otherwise fail.

Figure 3:
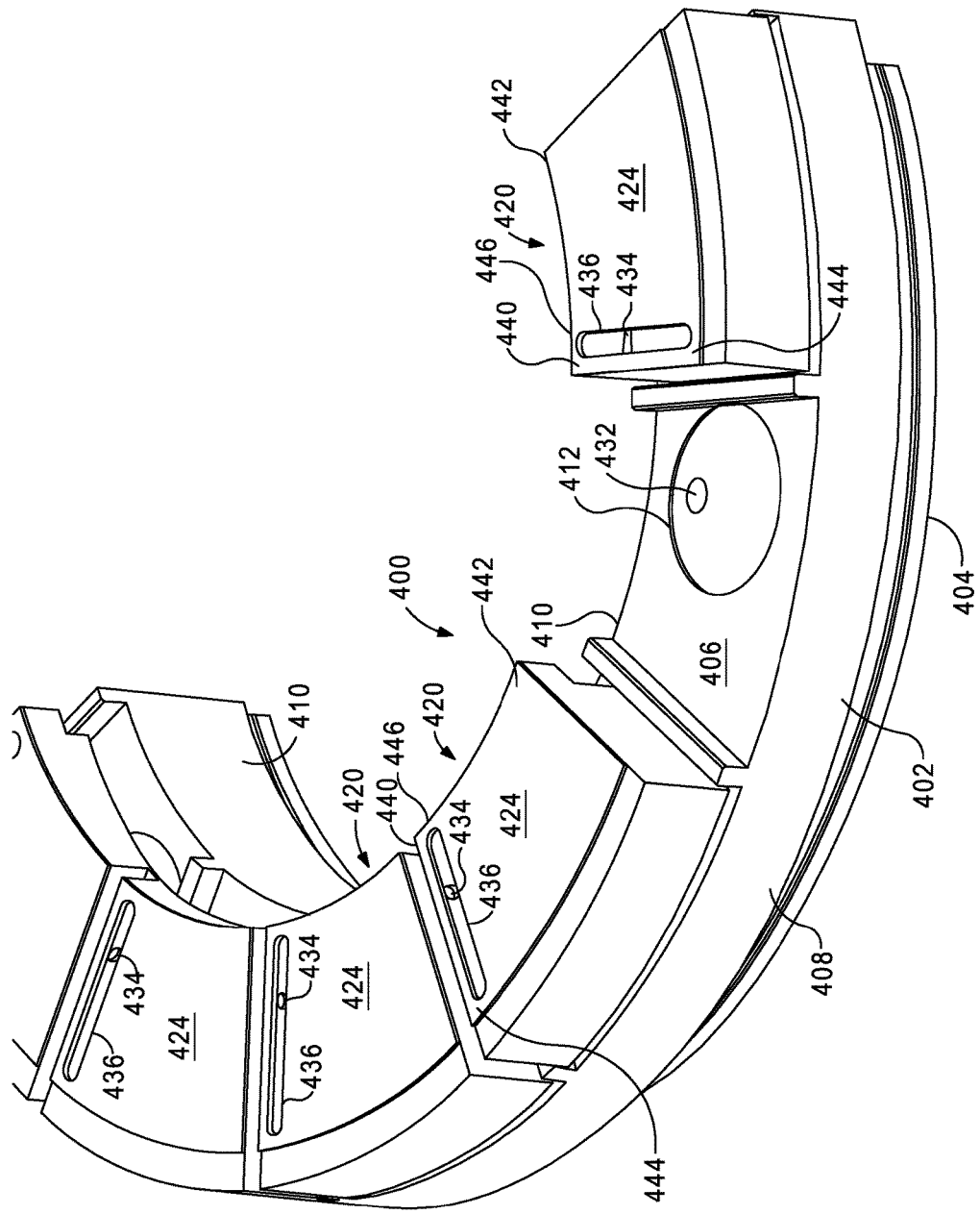
FIG. 3 illustrates a perspective view of a portion of a tilt pad thrust bearing, according to one or more embodiments disclosed.

FIG. 3 illustrates a perspective view of a portion of a tilt pad thrust bearing 400, FIG. 4 illustrates a top view of a portion of the tilt pad thrust bearing 400 depicted in FIG. 3, and FIG. 5 illustrates a cross-sectional view of the tilt pad thrust bearing 400 depicted in FIG. 4 taken along line V-V, according to one or more embodiments described. Referring to FIGS. 3-5, the thrust bearing 400 may include a support structure 402 having a first surface 404 and a second surface 406. In at least one embodiment, the support structure 402 may be an annular support ring having a first axial surface 404 and a second axial surface 406. An outer radial surface 408 of the support ring 402 may be coupled to or integral with a stationary portion of the turbomachine, e.g., the casing, and an inner radial surface 410 of the support ring 402 may be disposed radially-outward from the shaft.

A plurality of pivots 412 may be coupled to the second axial surface 406 of the support ring 402. Each pivot 412 may include a first surface 414 and a second surface 416. In at least one embodiment, the first surface 414 may be generally flat, and the second surface 416 may be arcuate. The first surface 414 may be coupled to the second axial surface 406 of the support ring 402. The second surface 416 may be coupled to and/or engaged with a first axial surface 422 of a pad 420. The pad 420 may be coupled to the pivot 412 such that the pad 420 may move freely or "tilt" to accommodate axial misalignment and prevent edge loading of the pad 420. A second axial surface 424 of the pad 420 may be adapted to engage and withstand axial thrusts derived from an annular disc (not shown) coupled to the shaft. In FIG. 3, one pad 420 has been removed to provide a view of the second axial end 406 of the support ring 402 and a pivot 412.

The support ring 402 may define a support structure channel or ring channel 430 extending from the first axial surface 404 of the support ring 402 to the second axial surface 406 of the support ring 402. The ring channel 430 may be in fluid communication with and contiguous with a pivot channel 432, which extends generally from the first axial surface 414 of the pivot 412 to the second axial surface 416 of the pivot 412. The pivot channel 432 may be in fluid communication with and contiguous with a pad channel 434, which extends generally from the first axial surface 422 of the pad 420 to one or more openings 436 (one is shown) in the second axial surface 424 of the pad 420. Thus, a path of fluid communication may extend from the first axial surface 404 of the support ring 402, through the pivot 412 (via the pivot channel 432), and to the opening 436 in the second axial surface 424 of the pad 420.

The opening 436 may be disposed proximate the leading edge 440 of the second axial surface 424, the trailing edge 442 of the second axial surface 424, or anywhere therebetween. As shown, the opening 436 is a radially-extending slot disposed proximate the leading edge 440 of the pad 102. In at least one embodiment, the pad channel 434 may be fluidly coupled generally to the center of the opening 436, i.e., equidistant between first and second radial ends 444, 446 of the pad 420. In another embodiment, the pad channel 434 may be fluidly coupled to the opening 436 closer to one radial end 446 than the other radial end 444, as shown. As such, the position of the channel 434 relative to the radial ends 444, 446 may influence the oil velocity distribution in the opening 436 and impact the temperature of the pad 420.

The opening 436 may include a plurality of openings (not shown). For example, the openings 436 may be radially spaced apart along the second axial surface 424 of the pad 420, i.e., between the first and second radial ends 444, 446 of the pad 420. The opening(s) 436 may have any cross-sectional shape including, but not limited to, a circle, an oval, a square, a rectangle, combinations thereof, or the like. The cross-sectional area of the opening(s) 436 may be varied depending on operating conditions of the turbomachine, such as friction, temperature, and frequency of use.

In operation, the lubricating fluid may be introduced and/or injected to the second axial surface 424 of the pads 420 to reduce the friction, and associated heat, between the pads 420 and the rotating annular disc coupled to the shaft. The lubricant may be introduced to the ring channel 430 proximate the first axial surface 404 of the support ring 402 and flow therethrough to the second axial surface 406 of the support ring 402 proximate the pivot 412. The lubricant may then flow from the ring channel 430 into and through the pivot channel 432. The lubricant may then flow from the pivot channel 432 into and through the pad channel 434 to the opening 436 in the second axial surface 424 of the pad 420. One or more flow control devices (not shown) may be disposed in the ring channel 430, the pivot channel 432, and/or the pad channel 434 to adjust the rate at which the lubricant flows therethrough.

The radially-extending opening 436 may enable the lubricant to be distributed across the radial width of the pads 420. Further, the opening 436 may be disposed proximate the leading edge 440 of the pads 420 such that the rotation of the annular disc may distribute the lubricant along the at least partially circumferential length of the pad 420 to the trailing edge 442. If it is desired to rotate the shaft in the opposite direction, the pads 420 may be rotated 180°. In another embodiment, the pads 420 may be removed from the support ring 402 and replaced with pads 420 having openings 436 in what is now the new leading edge 440. In this way, the support ring 402 is independent from the direction that the shaft rotates.

Figure 6:
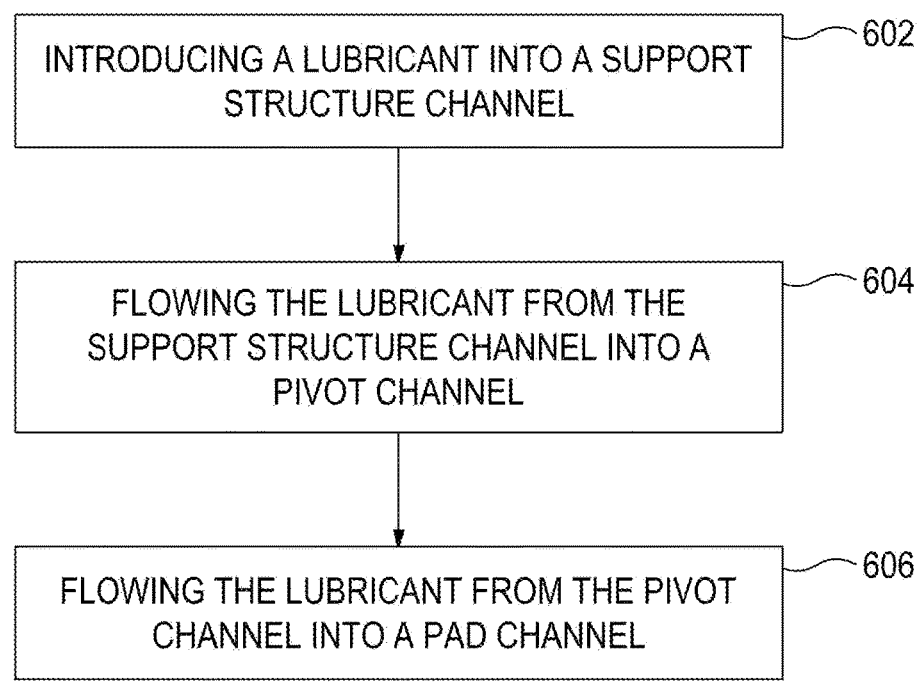
FIG. 6 is a flowchart of a method for lubricating a tilt pad bearing, according to one or more embodiments disclosed.

FIG. 6 is a flowchart of a method 600 of lubricating a tilt pad bearing, according to one or more embodiments disclosed. The method may include introducing lubricant through a support structure channel defined by a support structure, as shown at 602. The lubricant may then flow from the support structure channel into a pivot channel defined by a pivot and fluidly coupled to the support structure channel, as shown at 604. The pivot may be coupled to the support structure. The lubricant may then flow from the pivot channel into a pad channel defined by a pad and fluidly coupled to the pivot channel, as shown at 606. The pad may be coupled to the pivot such that the pad is adapted to tilt with respect to the support structure.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A tilt pad bearing, comprising:
   a support structure having first and second support structure surfaces;

a pivot having first and second pivot surfaces, the first pivot surface being coupled to the second support structure surface;

a pad having first and second pad surfaces, the first pad surface being coupled to the second pivot surface and the second pad surface being configured to contact and support a rotating shaft; and a path of fluid communication extending from the first support structure surface, through the pivot, and to an opening in the second pad surface, the opening being disposed proximate a leading edge of the pad.

2. The tilt pad bearing of claim 1, wherein the tilt pad bearing further comprises a tilt pad journal bearing, and wherein the support structure comprises a bearing cage.

3. The tilt pad bearing of claim 1, wherein the tilt pad bearing further comprises a tilt pad thrust bearing, and wherein the support structure comprises a support ring.

4. The tilt pad bearing of claim 1, wherein the path of fluid communication further comprises:

a support structure channel extending from the first support structure surface to the second support structure surface;

a pivot channel fluidly coupled to the support structure channel and extending to the second pivot surface; and a pad channel fluidly coupled to the pivot channel and extending to the opening in the second pad surface.

5. The tilt pad bearing of claim 4, wherein a lubricant is adapted to flow through the path of fluid communication to the second pad surface.

6. The tilt pad bearing of claim 5, wherein the lubricant is oil.

7. The tilt pad bearing of claim 1, wherein the opening comprises at least one of an axially-extending slot and a radially-extending slot.

8. A tilt pad bearing, comprising:

a support structure having first and second support structure surfaces and a support structure channel extending between the first and second support structure surfaces;

a pivot having first and second pivot surfaces, the first pivot surface being coupled to the second support structure surface, the pivot defining a pivot channel that extends between the first and second pivot surfaces and is in fluid communication with the support structure channel; and a pad having first and second pad surfaces, the first pad surface being coupled to the second pivot surface and the second pad surface being configured to contact and support a rotating shaft, the pad defining a pad channel that extends from the first pad surface to the second pad surface and is in fluid communication with the pivot channel, wherein the support structure channel, the pivot channel, and the pad channel define a path of fluid communication from the first support structure surface to an opening in the second pad surface, the opening being disposed proximate a leading edge of the pad.

9. The tilt pad bearing of claim 8, wherein tilt pad bearing further comprises a tilt pad journal bearing, and wherein the support structure comprises a bearing cage.

10. The tilt pad bearing of claim 8, wherein the tilt pad bearing further comprises a tilt pad thrust bearing, and wherein the support structure comprises a support ring.

11. A method of lubricating a tilt pad bearing, comprising:

introducing a lubricant to a support structure channel defined by a support structure;

flowing the lubricant from the support structure channel into a pivot channel defined by a pivot having first and second pivot surfaces, the pivot channel fluidly coupled to the support structure channel, wherein the first pivot surface is coupled to the support structure;

flowing the lubricant from the pivot channel into a pad channel defined by a pad comprising:

a first pad surface coupled to the second pivot surface; and a second pad surface configured to contact and support a rotating shaft, wherein the pad channel extends from the first pad surface to the second pad surface and is fluidly coupled to the pivot channel, the pad being coupled to the pivot such that the pad is adapted to tilt with respect to the support structure; and flowing the lubricant from the pad channel through an opening in the second pad surface, the opening being disposed proximate a leading edge of the pad.

12. The method of claim 11, wherein the tilt pad bearing comprises a tilt pad journal bearing, and wherein the support structure comprises a bearing cage.

13. The method of claim 11, wherein the tilt pad bearing comprises a tilt pad thrust bearing, and wherein the support structure comprises a support ring.

* * * * *